Figure 1:
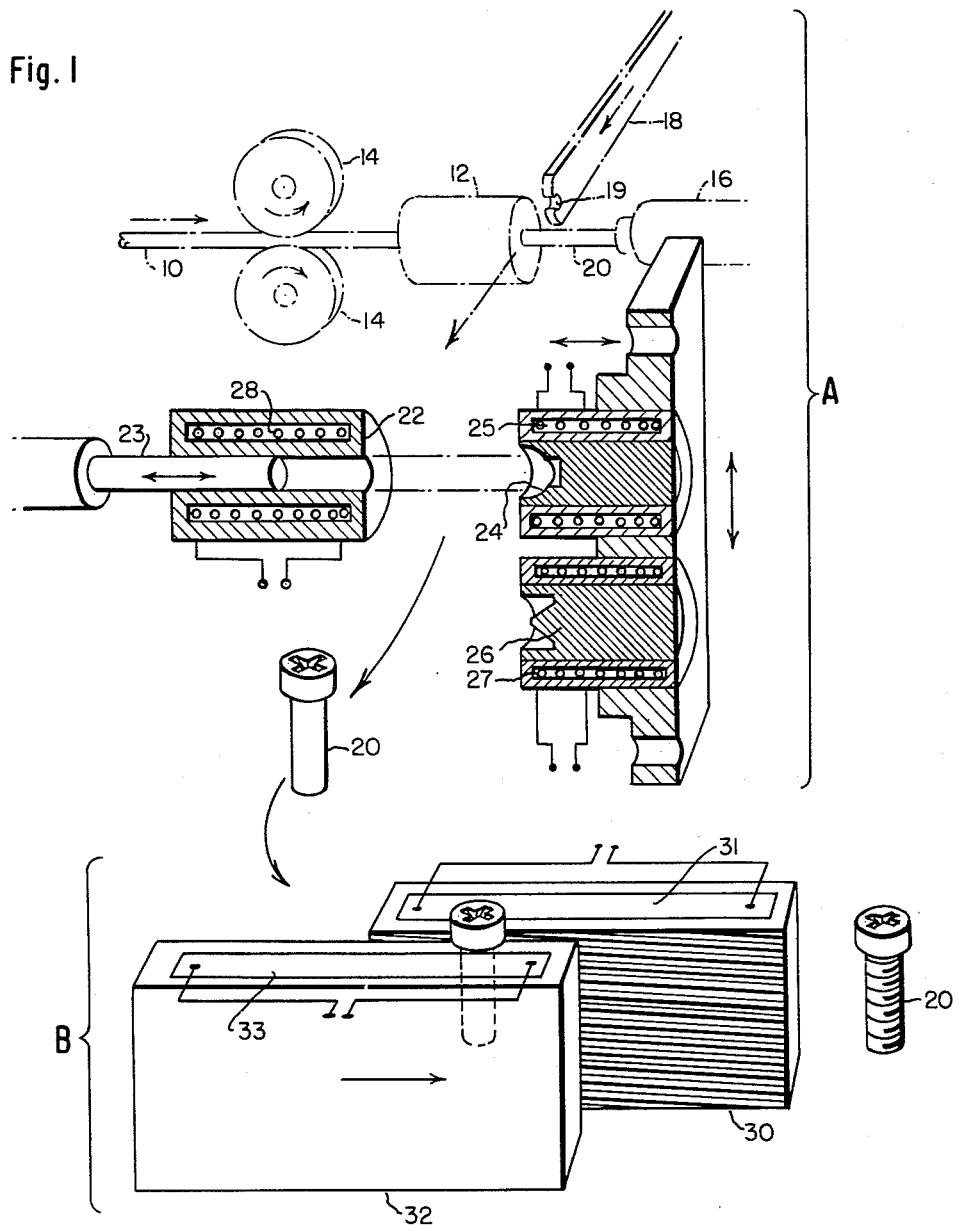

INVENTORS
ALBERT BARBER
RODMAN HARDY
HARRY ROWBOTHAM

United States Patent Office 2,957,205
Patented Oct. 25, 1960

2,957,205

PROCESS OF FORMING SCREW THREADS ON A COLD ROD OF RIGID THERMOPLASTIC MATERIAL

Albert Barber and Rodman Hardy, New Bedford, and Harry Rowbotham, South Dartmouth, Mass., assignors, by mesne assignments, to Black & Webster, Inc., Watertown, Mass., a corporation of Massachusetts Filed Aug. 1, 1956, Ser. No. 601,551

4 Claims. (Cl. 18—56)

This invention consists in a novel method of forming shaped thermoplastic articles and includes articles thus formed within its scope.

The most common methods of forming shaped thermoplastic articles consist in either causing the thermoplastic material to flow to the desired form, or cutting or otherwise removing portions from solid thermoplastic stock to bring it to the desired form. Typical of the first type of process are the well known molding, casting and extruding processes in which the thermoplastic is rendered flowable through being heated to a plastic or liquid condition or through being in a finely divided form. The second type of process is represented by machining operations by which the thermoplastic stock is sawed, turned, bored or otherwise cut to the desired shape.

In addition to these common methods of forming thermoplastics, two other methods of interest have been described with specific reference to nylon. In U.S. Patent No. 2,244,208 of Miles there is disclosed a cold working process in which cold nylon stock is subject to compressional forces and thereby cold worked. In this process the compressional strain apparently exceeds the elastic limit sufficiently to cause permanent deformation by the amount desired to form the desired shape. The process is particularly suited for the processing of nylon sheet stock.

A hot swaging or forging operation specifically applicable to nylon is described in U.S. Patent No. 2,525,972 of Stott. This process consists in first softening the nylon by heating it to an elevated temperature below its melting point (i.e. to within the temperature range of 440° to 480° F.) and then subjecting the heated stock to compressional forces to bring it to its final form. In this process the heated stock is in a sufficiently plastic condition to permit the desired degree of deformation.

While intricately shaped objects of nylon and similar thermoplastics may be formed by casting, molding or machining, these methods are time consuming, generally require expensive equipment, and machining has the further disadvantage of high wastage.

The processes described by Miles and Stott have been found to be unsuitable for forming accurately dimensioned articles of intricate shape. In the Miles process the article is subject to elastic recovery, and in the Stott process pre-softening renders the stock difficult to handle during the steps preliminary to the forming operation, particularly when those steps are carried out on conventional automatic machinery such as is used for forming metal objects.

None of the prior art processes is well adapted for rapidly forming thermoplastic articles by operations of the type performed on metal stock by the application of dies under high pressure, e.g. by upsetting, swaging, thread rolling, etc. In such operations the metal stock is initially cold and solid and is forced to cold flow into the desired form. Deformable theromplastics, however, generally exhibit such a high degree of elastic recovery when cold as to be incapable of being formed with precision by such operations, and when heated to an initially soft condition thermoplastic materials lose that degree of solidity characterizing the solid materials, such as metals with which such processes are so useful. As a result the formation of thermoplastic articles such as screws, bolts, rivets and numerous other shapes has been limited to molding, casting and machining operations.

Not only have these prior processing limitations restricted the means by which plastic articles can be formed, but they have also limited the types of molecular structures that may be imparted. While numerous thermoplastic materials, such as nylon, which is highly crystalline, may be formed with an oriented molecular structure of increased strength, such oriented structure has generally been applicable only to filaments of the material. Cast or molded objects are inherently formed with a random orientation and machined articles generally retain the orientation of the stock of which they are formed.

The present invention provides a process by which thermoplastic materials may be rapidly, inexpensively and accurately formed by the rapid application of deforming forces, as represented by such operations as upsetting, swaging and thread rolling.

Moreover, it is possible by this invention to form plastic articles in which a relatively high degree of orientation may be present, and as a result the articles so formed are generally harder and stronger than those made by prior art processes.

The process of this invention is generally applicable to any deformable, non-elastomeric, rigid thermoplastic material which may be deformed elastically when cold. Particularly suitable are the high tensile strength, high molecular weight crystalline polymers which may be formed into fibers, such as is typified by nylon, polyethylene, polyethylene terephthalate, polyurethanes, polyacrylonitrile, polyvinylidene chloride, vinylidene chloride-vinyl chloride copolymers, and polyvinyl chloride to name but a few more common crystalline polymers.

In general the process of this invention is carried out by deforming a blank of solid thermoplastic material to the desired form such that at least part of the deformation is elastic, and then heating the blank while it is so deformed to bring its temperature to a point below the melting point where the internal recovery stresses are relieved. The blank of plastic material is accordingly initially at a sufficiently low temperature as to be elastically deformable and as such is sufficiently rigid as to be easily handled. By causing an initial deformation which is partially elastic, the blank is brought rapidly to its desired final form which is permanently imparted by the subsequent heating. It has been found that stress relief of this type will occur at a temperature well below the melting point and while the plastic is still sufficiently rigid that it may be removed from the pressure immediately upon this temperature having been reached. Cooling of the plastic while under pressure is accordingly entirely unnecessary to the process of this invention.

Typically the process is carried out in apparatus conventionally used for swaging, upsetting or thread rolling metal stock with the addition to it of means for heating the plastic as pressure is applied and elastic deformation occurs. In apparatus of this type the plastic is deformed by dies which are forcibly applied to the plastic. Heating is most conveniently applied by heating the dies. The degree of heating necessary will vary depending on the amount of plastic deformed and on the degree of deformation, but it may readily be ascertained, for if the temperature is too low elastic recovery of the plastic from die-form occurs as the blanks leave the apparatus, and if heating is too high, the plastic articles leave the apparatus in a highly softened or partially molten condition. Either of these conditions may easily be detected by one versed in the art and the temperature adjusted accordingly.

In carrying out the process the blanks of solid plastic stock are at the start of operations typically at room temperature although a higher or lower temperature may be used as long as it is not so low that the plastic is too brittle nor so high that it is soft or rubbery.

Plastic articles formed in accordance with this invention possess structure which reflects the improved processing conditions. In general the fact of an initial deformation which is at least partially elastic, followed by heating to relieve the internal recovery stresses, results in an unstressed internal structure, at least so far as observations by polarized light will show. In addition, where the forming operation involves high degrees of material displacement of a highly crystalline polymer such as nylon, the relieving of the recovery stresses tends to bring about a characteristic orientation of the plastic material at the surface of the article which evidences marked polarization extinction effects when examined microscopically between crossed polarizers.

Figure 2:
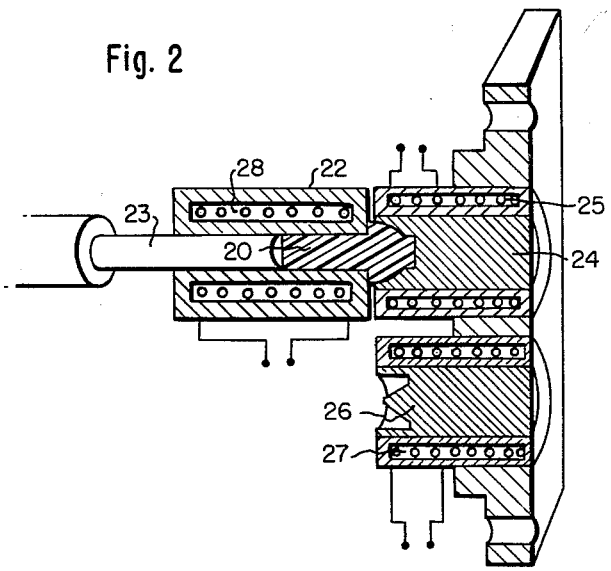
Figure 3:
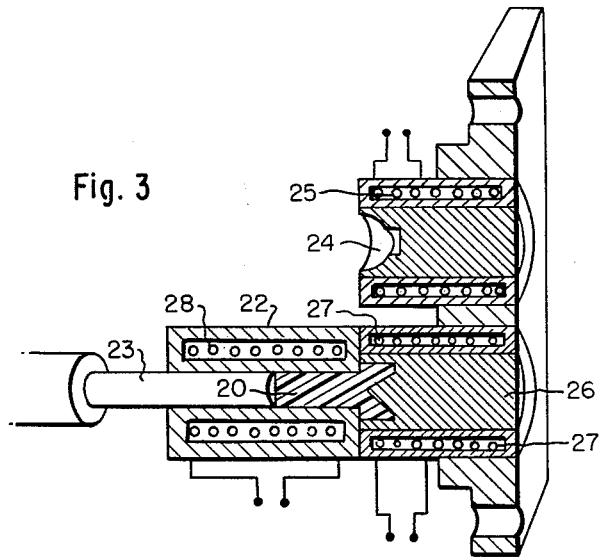

A representative and preferred embodiment of this invention, as it is applied to the manufacture of Phillips head screws, is described in detail below with reference to the accompanying drawings in which:

Fig. 1 is a schematic drawing, generally in perspective, of apparatus for performing the steps of upsetting the head and thread rolling the thread on nylon blanks, part being shown in section to reveal operational and constructional details, Fig. 2 is a perspective view partly in cross section showing a cold forming operation by which a preliminary enlargement of the head portion of a blank of nylon stock is formed, Fig. 3 is a perspective view partly in cross section showing the formation of the Phillips head on a nylon blank in accordance with the process of this invention.

The present invention is ideally suited for the manufacture of screws from rod stock of plastic materials by the operations of upsetting the screw heads on appropriate blanks and then thread rolling the blanks. In such operations apparatus conventionally used for making metal screws by similar operations may be used provided provision is made for heating the dies and maintaining them at the proper temperature. In the following example these operations are described as being performed on nylon rod stock by means of conventional upsetting and thread rolling apparatus, of which only those parts operative on the nylon stock are shown and described, the machines as a whole being well known commercial equipment which forms per se no part of this invention.

In the upsetting machine, the operative parts of which are designated by the bracket A in Fig. 1, nylon rod stock is fed by feed rollers 14 through a cut-off quill 12 until the end of the stock strikes a wire stop 16 situated opposite the base of the quill by the distance equal the length of a blank 20. A cut-off knife 18 having a cutting edge formed wtih a notch 19 then reciprocates against the face of the quill 12, cutting the blank 20 from the rod 10 and carrying it by means of the notch 19 into alignment with the bore of a header die 22.

The Phillips head of the screw is formed on the blank 20 by a pair of dies, the first being a punch 24 having a cupped face which enlarges the head end of the blank, and the second being a header 26 having a face accurately corresponding to the final desired form of the screw head. These dies are applied alternately to the header die 22, the punch 24 serving first to seat the blank 20 in the bore of the header die 22 as the knife 18 retracts, and then to press the blank to enlarge the head. Each of the dies 24 and 26 is applied rapidly to force the nylon of the head end of the blank 20 to form by a combination of elastic and plastic deformation, and each is then held against the blank in the fully deformed position while the blank is heated to relieve it of its ability to recover elastically. After the head of the blank 20 has been so formed, by each of the dies 24 and 26, each is retracted from the header die 22, and the blank 20, after being finally formed by the header 26, is ejected from the header die by an ejector pin 23.

The steps of the head forming operations are shown in Figs. 2 and 3. In Fig. 2 the punch 24 is shown in its advanced position where it has formed the enlarged head, and in Fig. 3 the header 26 is shown in advanced position in which the final Phillips head is formed.

In practicing the upsetting operations in the preferred manner shown, the header die 22, punch 24 and header 26 are heated, conveniently by the respective windings 28, 25 and 27 of resistance wire provided in an annular space formed in each of these members. A variable voltage power source (not shown) connected to each of these windings permits adjustment of the temperature of the die to provide the proper amount of heating of the head after it has been preliminarily formed under the force of the punch 24 and header 26.

After the head has been formed on the blank 20, the screw threads are formed in a conventional thread rolling machine.

On the thread rolling machine, the operative parts of which are designated generally by the brackets B of Fig. 1, threads are formed by rolling the blanks 20 between a stationary die 30 and a reciprocating parallel die 32, each of which is formed with surface grooves corresponding to the turns of the threads to be formed. The reciprocating die 32 travels in a slightly converging path such that at the beginning of each thread rolling stroke the spacing is substantially the diameter of the stock and at the finish end it is somewhat closer by the distance necessary to form the threads. Thus as the blank rolls across the face of the stationary die it is pressed between the dies and the screw threads are thereby molded into its surface.

The thread rolling dies 30 and 32 are similarly heated conveniently by means of resistance heating elements 31 and 33 located within a pocket in the body of the dies. Each of these is similarly supplied from a variable voltage power source such that the proper temperature may be attained.

In a typical operation such as the forming of a Phillips head and threads of a No. 8/32 screw on 0.1385 inch diameter nylon 6–6 (polyhexamethylene adipamide) rod stock, the punch 24 and header 26 are each applied to deform the blank to die form rapidly, generally in a fraction of a second and held in their advanced positions against the fully deformed blank for between about 2 and 30 seconds, while the blank is being heated. Heating is carried out by maintaining these dies and also the header die 22 each at a temperature between about 325° F. and 480° F.

The thread rolling dies 30 and 32 are also brought to within the temperature range of 325° F. to 480° F., and are adjusted as to speed such that the blanks are between the thread rolling dies between about 2 and 30 seconds.

The time of pressure and temperature are, of course, mutually dependent and also depend on the amount of deforming to be undertaken. At the lower temperatures a longer time is required to effect internal stress relief and the impartation of true form, while at higher temperatures the time required is reduced. Increased amounts of deformation, on the other hand, impose longer time and/or higher temperature requirements.

Nylon screws formed in the manner described have been examined microscopically under polarized light, and have been found to exhibit a characteristic structure which is readily apparent because of the crystalline and birefringent nature of nylon. The rod stock, as purchased, has a random arrangement of nylon crystals in which spherulite[1] particles having no overall orientation predominate in a random mosaic pattern. In nylon screws formed as described above, the interior of the screws possesses the same pattern, without showing any polarization color effects of a structure having internal stresses. The surface of the screw head and threads, however, is quite different in being clear and showing a distinct extinction pattern characteristic of an oriented crystalline molecular structure. The effect is to a depth of about 0.05 mm., but will vary depending on the degree of deformation that has occurred. This surface region is similarly largely devoid of the color patterns characteristic of a structure having internal stresses.

By way of comparison, nylon blanks pressed and deformed, without heating to cause relief of elastic recovery stresses, were also examined, and were found to show the polarization color patterns of a severely stressed structure, particularly at the surface, and to be devoid of any local oriented surface region such as produces a polarization extinction pattern.

Articles so formed in accordance with this invention have the particular advantage of having markedly increased hardness and strength which is believed to be the result of an oriented surface region.

Although described in detail with specific reference to the preferred embodiment, it is contemplated that numerous modifications will readily occur to those skilled in the art, and that such may be made without departing from the scope of this invention.

In particular it is noted that the temperature to be attained during the heating need only be sufficient to relieve the deformed thermoplastic of internal elastic recovery stresses such that there is substantially no elastic recovery of the blank upon relief of the deforming pressure along with substantially complete elimination of internal stresses as may be shown by polarization color patterns. The actual temperature attained will vary considerably depending on the nature and type of thermoplastic material and on the degree of deformation. Moreover the temperature will frequently vary throughout the bulk of plastic material, particularly when heated dies are used. Since, however, the amount of internal stresses are apparently greatest at the surface, adequate heating at the surface is of more importance than uniformity.

In the embodiment described in detail, heating is carried out by heating all three dies, this being a convenient and rapid method. Other methods, however, are also satisfactory, e.g. heating of only the header 26, with pressure being applied for much longer periods of time to achieve a proper temperature throughout. Other methods of heating, as by means of high frequency electrical energy, may also be used satisfactorily.

In addition to upsetting and thread rolling operations, this invention may be used for any manner of forming wherein the thermoplastic material is forcibly deformed at least partially elastically, to a final form, if provision is made to heat the thermoplastic after it has been so deformed. The process is accordingly also adaptable to the formation of plastic articles by any operation employing dies applied under a pressure sufficient to effect plastic deformation. It will accordingly be appreciated that the invention has a wide range of utility adaptive to numerous forming operations which could not heretofore be practiced on thermoplastic materials. In addition, the invention may be used to provide an improved novel structure in crystalline fiber-forming thermoplastic polymers.

Having thus disclosed our invention and described in detail a preferred embodiment thereof, we claim and desire to secure by Letters Patent the subject matter of the following claims:

1. The method of forming screw threads on an elongated cold solid rod of rigid thermoplastic material comprising pressing the portion of said rod to be threaded between heated thread rolling dies to deform the rod compressively at least partially elastically and to impart a threaded surface thereto while rolling said portion between said dies at a rate such that said portion is held deformed under the pressure of the dies until the temperature of said portion is raised to a point below its melting point effective to prevent substantially all elastic recovery of the rod so that the threads are retained thereon, and removing the rod from the dies.

2. The method defined by claim 1 wherein the thermoplastic material is nylon.

3. The method of forming a screw from an elongated cold solid rod of rigid thermoplastic material comprising first forming a head on said rod by applying a heated upsetting die to an end portion of said rod under pressure to deform the rod compressively at least partially elastically and to impart a shaped head configuration thereto, holding said end portion deformed under the pressure of the die until the temperature of said portion is raised to a point below its melting point effective to prevent substantially all elastic recovery of the rod so that the head is retained thereon, and removing the die, then forming screw threads on said rod by pressing the portion of said rod to be threaded between heated thread rolling dies to deform the rod compressively at least partially elastically and to impart a threaded surface thereto while rolling said portion between said dies at a rate such that said portion is held deformed under the pressure of the dies until the temperature of said portion is raised to a point below its melting point effective to prevent substantially all elastic recovery of the rod so that the threads are retained thereon, and removing the rod from the dies.

4. The method of forming a screw from an elongated cold solid rod of nylon comprising first forming a head on said rod by applying a heated upsetting die to an end portion of said rod under pressure to deform the rod compressively at least partially elastically and to impart a shaped head configuration thereto, holding said end portion deformed under the pressure of the die until the temperature of said portion is raised to a point below its melting point effective to prevent substantially all elastic recovery of the rod so that the head is retained thereon, and removing the die, then forming screw threads on said rod by pressing the portion of said rod to be threaded between heated thread rolling dies to deform the rod compressively at least partially elastically and to impart a threaded surface thereto while rolling said portion between said dies at a rate such that said portion is held deformed under the pressure of the dies until the temperature of said portion is raised to a point below its melting point effective to prevent substantially all elastic recovery of the rod so that the threads are retained thereon, and removing the rod from the dies.

References Cited in the file of this patent

UNITED STATES PATENTS

| | | |
|---|---|---|
| 2,234,994 | Vernon et al. | Mar. 18, 1941 |
| 2,239,780 | Fikentscher | Apr. 29, 1941 |
| 2,244,208 | Miles | June 3, 1941 |
| 2,291,873 | Brubaker | Aug. 4, 1942 |
| 2,317,409 | Seaton | Apr. 27, 1943 |
| 2,392,842 | Doell | Jan. 15, 1946 |
| 2,607,956 | Brutus | Aug. 26, 1952 |

OTHER REFERENCES

Fasteners Magazine, vol. 10, Number 4, pages 8–10 relied upon. Copy in Scientific Library and in Division 57.

---

[1] Spherulite nylon is described in detail in H. J. Wood, Physics of Fibres, The Institute of Physics, London, 1955; Keller, Nature (London) 169, 913 (1952); and Keller, Nature (London) 191, 170 (1953).